Sept. 21, 1971  W. N. LAWLESS  3,606,637
APPARATUS FOR COMPRESSING MATERIALS
Filed April 8, 1968  2 Sheets-Sheet 1

INVENTOR.
William N. Lawless
BY
*Walter S. Zabrowski*
ATTORNEY

Sept. 21, 1971   W. N. LAWLESS   3,606,637
APPARATUS FOR COMPRESSING MATERIALS
Filed April 8, 1968   2 Sheets-Sheet 2

INVENTOR.
*William N. Lawless*
BY
*Walter S. Zebrowski*
ATTORNEY

United States Patent Office 3,606,637
Patented Sept. 21, 1971

3,606,637
APPARATUS FOR COMPRESSING MATERIALS
William Nicholas Lawless, Corning, N.Y. assignor to
Corning Glass Works, Corning, N.Y.
Filed Apr. 8, 1968, Ser. No. 719,536
Int. Cl. B30b 11/02
U.S. Cl. 18—16R                                    6 Claims

ABSTRACT OF THE DISCLOSURE

An improved hot-pressing apparatus is disclosed in which a material, such as a powder, is compressed into a highly densified body free from excessive contamination by impurities and free from porosity due to the entrapment of gases therein. Raised ribbing formed upon the body of a movable cylindrically shaped die permits ease of insertion and removal of the die in the die bore. Channels formed in the bore defining surface of the apparatus which extend from the bore entrance along a portion of the length thereof facilitate the rapid removal of gases from the material and apparatus.

BACKGROUND OF THE INVENTION

Various hot-pressing and pressure-sintering apparatus for producing highly desified masses of material in various shapes and sizes are well known in the prior art. Such conventional apparatus comprise a movable piston-like die, usually of cylindrical cross-section, an anvil like stationary die, usually of disk shape, and a bore defining casing in the bottom of which the stationary die is tightly fitted. The bore of the casing guides the movement of the movable die so that its bearing surface can be brought into closing relation with the bearing surface of the stationary die with sufficient force to compress a material therebetween which is supported on the stationary die.

In one process of sinter-pressing, a particulate material, to be compressed with the above-mentioned apparatus, is disposed on the bearing surface of the stationary die prior to insertion of the movable piston in the die bore. The movable die is thereafter inserted in the bore and the entire apparatus is placed in a vacuum chamber with the movable die positioned below a vertically movable motor operated ram head. In a first step the space within the chamber is evacuated and the apparatus is heated until the temperature of the particulate material in the die bore is sufficiently high to permit its compression at the desired die pressure. During this period the chamber vacuum aids in drawing out gases which are entrapped in the material. The escaping gases filter out of the apparatus between the surface of the die bore and the movable cylindrical piston and into the vacuum space of the chamber where they are removed by a vacuum pump.

In a second step following the removal of gases from the material, the movable die is driven by the ram head into closing relation with the stationary die to compress the material therebetween. In most applications it is desirable to compress the material with great pressure for a considerable length of time in order to produce a densified body of material having the desired properties.

After the material has been densified, the chamber vacuum is broken and the apparatus is removed. Thereafter the stationary disk and the densified material is removed, ordinarily by forcing both out the bottom of the bore by pushing the movable die through the bore either by hand or with a suitable machine.

Several difficulties have been encountered in the use of such prior art apparatus with respect to both the outgassing of the apparatus during the initial step of heating the particulate material in the vacuum chamber, and with respect to the undesirable extrusion of the material between the wall of the bore and the movable die during the compression step. In the past it has not been readily possible to sufficiently reduce or eliminate one of the above-mentioned difficulties without enhancing the other.

For example, it has been the practice in the prior art to use a movable die which closely fits the die bore circumference in order to prevent excessive extrusion of the material during compression. However due to the close tolerance of the die with the die bore it has been difficult to outgas the apparatus during the heating step. In some cases it has taken hours to sufficiently outgas the material while in other cases it has been impossible to outgas the apparatus sufficiently to prevent voids and porosity in the compressed material. Further, it has often been difficult to remove the movable die from the bore following the pressing step due to the existence of small amounts of extruded material lodged between the movable die and the wall of the bore.

In order to provide effective outgassing of such prior art apparatus, a movable die which loosely fits within the die bore has been employed. However, this has often resulted in the excessive extrusion of the material between the die and die bore, particularly where readily extrudable materials are being compressed. To minimize this latter problem an inert material such as, for example, alumina powder has been disposed in cushioning layers above and below the material to be compressed. Though such a procedure has been effective to reduce the amount of extrusion in some cases, a new problem is thereby created in that the inert material tends to contaminate the material being pressed.

To avoid the above-mentioned difficulties I have invented an apparatus for compressing a material which readily permits the rapid outgassing of the apparatus without thereby enhancing the problem of extrusion during the compression step. Moreover, the apparatus of the instant invention permits compression of a material therein with a minimum amount of extrusion resulting. Further, difficulties that have been encountered in the prior art in insertion of a close fitting movable die into its die bore have been overcome, as well as the difficulties that have been encountered in removing the close fitting die from its bore due to the compaction of small amounts of extruded material on the wall thereof. Finally, the need for using an inert material as a cushion to avoid problems of excessive extrusion is eliminated thus permitting materials to be densified without undue contamination.

SUMMARY OF THE INVENTION

Accordingly, it is an object of the instant invention to provide an apparatus for compressing a material which permits rapid outgassing of the material prior to its compression without thereby enhancing its extrusion during compression.

It is a further object of the instant invention to provide an apparatus for compressing a material with a minimum amount of extrusion occurring during compression.

It is yet another object of the instant invention to provide an apparatus for compressing a material into a highly densified body substantially free from porosity due to the entrapment of gases therein.

It is still another object of the instant invention to provide an apparatus for compressing a material with a minimum amount of extrusion occurring during compressing without causing excessive contamination of the compressed material as a result.

It is another object of the instant invention to provide an apparatus for compressing a material with a close fitting movable die and die bore in which the movable die can more readily be inserted and removed than has been possible using pressing apparatus known in the prior art.

Briefly, in accordance with the instant invention, there is provided a cylindrically shaped first die having a cross-sectionally enlarged end portion containing a bearing surface. The first die has raised ribbing formed thereon whch extends from the end portion of the die along at least a portion of the length thereof. A casing is provided having a cylindrical die bore therein for receiving the first die in close fitting relation between the surface of the casing defining the bore and the rims of the end portion and ribbing. At least one channel is formed in a bore defining surface portion of the casing which extends from the entrance of the bore along a portion of its length. A second die is disposed in the bore in close fitting relation with the bore defining surface of the casing so that the bearing surface of the second die faces the entrance of the bore and is positioned beyond the end of the channel. Means is provided for holding the first die partially inserted in the bore in such a manner that the space between the dies communicates with the channel. And lastly, a means is provided for bringing the dies into closing relation beyond the end of the channel.

Additional objects, features, and advantages of the instant invention will become obvious to those skilled in the art from the following detailed description and attached drawings on which, by way of example, only the preferred embodiments of the instant invention is illustrated.

DETAILED DESCRIPTION

Figure 1:
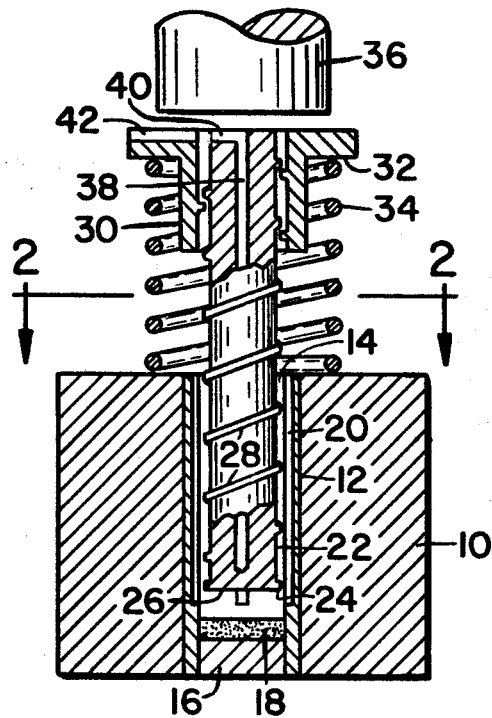
FIG. 1 shows a partially cross-sectioned elevation of one embodiment of the apparatus of the instant invention.
Figure 2:
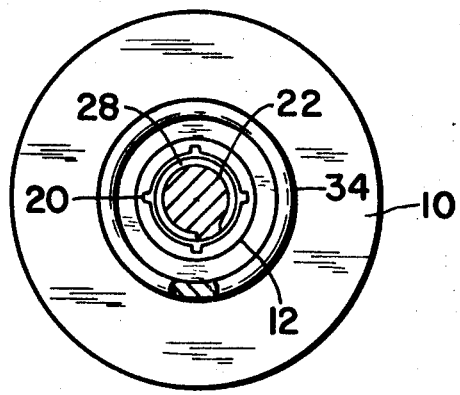
FIG. 2 shows a cross-sectional view of the apparatus of FIG. 1 taken along lines 2—2 thereof.

Referring to FIGS. 1 and 2 there is shown a casing 10 having a cylindrical hole therethrough which contains a removable hollow cylindrical liner 12, the interior of which defines a die bore 14. A removable disk shaped die 16 is securely lodged in the bottom of the bore 14. A mass of material 18 to be compressed by the apparatus of the instant example is disposed on the bearing surface of the die 16.

To facilitate the removal of gases which escape from the material 18, channels 20 are formed in a surface portion of the liner 12 which extend from the entrance to the bore 14 along a portion of the length thereof, ending above the level of the material 18. A vertically movable cylindrically shaped die 22, having a cross-sectionally enlarged end portion 24 on the end of which is a bearing surface 26, is supported in a position of partial insertion inside the bore 14. About the body of the die 22 there is formed a raised helically shaped rib 28 which extends from the end portion 24 preferably along the entire length of the die 22. The rim of the end portion 24 is adapted to closely fit the bore defining surface of the liner 12, preferably having a diameter of within five thousandths of an inch thereof, so as to eliminate excessive upward extrusion of portions of the material 18 around the end portion 24 during the pressing operation. The cross-sectional diameter of the rib 28 is substantially the same as the diameter of the end portion 24 to permit the die 22 to travel smoothly in the bore 14 without binding or catching therein.

To permit gases to escape from the material 18 along the channels 20 during heating of the material 18 prior to the pressing step, the die 22 is suspended in the bore 14 so that the bearing surface 26 is above the end of the channels 20. This is accomplished in the instant example by a cap 30 having a threaded hole therethrough, which threading conforms to the rib 28, to permit the cap 30 to screw onto the top end of the die 22. A shoulder 32 of the cap 30 rests on a coiled spring 34 which in turn is supported by the top of the casing 10. The spring 34 has sufficient strength to support the combined weight of the cap 30 and the die 22 so that the bearing surface 26 is positioned above the end of the channels 20. The rib 28 overlaps the threading of the cap 30 such that the upward reaction force of the spring 34 on the shoulder 32 due to the combined weight of the cap 30 and die 22 supported thereon causes the threading of the cap 30 to support the die 22.

After outgassing of the material 18 has been completed, during a heating step, the material 18 is pressed into a densified mass by forcing the die 22 downward with a conventional hand or motor driven ram 36. The loose fit between the threading of the cap 30 and the overflapping rib 28 permits the cap 30 to displace downwardly in relation to the body of the die 22 should the top of the shoulder 32 be slightly higher than the end of the die 22 as the ram 36 bears downward thereon. Such downward displacement of the cap 30 insures that the full driving force of the ram 36 is brought to bear on the end of the die 22 directly and eliminates the possibility of shearing the rib 28 by bearing thereon with the overlapping threading of the cap 30.

The temperature of the material 18 is measurable in a conventional manner with a thermocouple, not shown, positioned in the bottom of the shaft 38. Thermocouple lead wires, not shown, are brought out of the die 22 along a groove 40 in the end thereof which is deep enough to provide clearance between the lead wires and the ram 36. A similar groove 42 in the shoulder 32 is aligned with the groove 40 to permit passage of the lead wires under the ram 36 and away from the apparatus. During compression of the material 18 the end portion 24 is displaced downward thus interrupting communication between the space between the dies 16 and 22 and the channels 20 so as to prevent the excessive extrusion of portions of the material 18 upwardly through the channels 20. However, some materials have the capability of extruding easily, even between the tightly fitted end portion 24 and the liner 12. In such cases the extruded material 18 follows the upward helical path of the rib 28 rather than tending to compact and bind between the die 22 and the surface of the liner 12.

Upon completion of the compression of the material 18 the apparatus is removed from the vacuum environment in which it has previously been placed. The material 18 so compressed is removed from the bore 14 by forcing both the die 16 and the material 18 from the bottom of the bore 14 by pushing the die 22 inwardly against the material 18. Thereafter the die 22 is removed from the bore 14 by removing the cap 30 and forcing the die 22 through the bore 14 and out of the bottom. Pushing the die 22 through the bottom of the bore 14 may be preferable to pulling the die 22 from the top of the bore 14 following a pressing operation since the presence of a small amount of extruded material along the wall of the liner 12 may tend to bind or freeze the die 22 within the bore 14.

Figure 3:
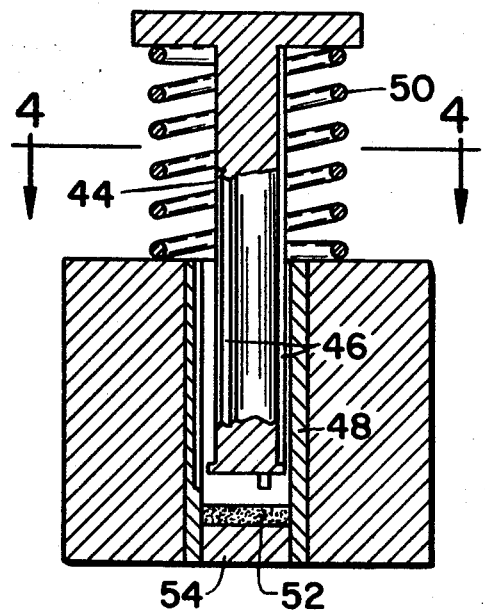
FIG. 3 shows a partially cross-sectioned elevation of another embodiment of the apparatus of the instant invention.
Figure 4:
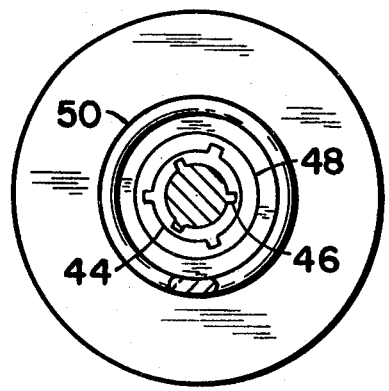
FIG. 4 shows a cross-sectional view of the apparatus of FIG. 3 taken along lines 4—4 thereof.

Referring to FIGS. 3 and 4 there is shown a vertically movable cylindrically shaped die 44 having three longitudinally extending raised ribs 46 thereon, the rims of which closely fit the inside wall of a cylindrically shaped hollow liner 48. The ribs 46 are equally spaced around the body of the die 44 to permit the die 44 to travel smoothly within the liner 14 without bending or catching therein. The top end portion of the die 44 is flanged sufficiently to permit the die 44 to be supported by a coiled spring 50 in the same manner as discussed previously in relation to FIGS. 1 and 2. A disk shaped removable die 54 is securely positioned within the bore defined by the liner 48 and supports a material 52 to be compressed on its bearing surface. Upon completion of a pressing operation the densified material 52 and die 54 is removed from the liner 48 by pushing it out of the bottom of the bore with the die 44. Thereafter the die 44 is removed from the bore by pulling upwardly on the flanged end thereof. Channels 56 formed in the liner 48 and extending from the entrance to the bore along a portion of the length thereof facilitate the removal of gases from the material 52 and the bore as previously explained.

Although the instant invention has been described with respect to specific details of certain embodiments thereof it is not intended that such details be limitations on the scope of the instant invention except insofar as set forth in the following claims.

I claim:

1. An apparatus for compressing a material comprising
   a cylindrically shaped first die having a cross-sectionally enlarged end portion containing a bearing surface, said first die having raised ribbing formed thereon extending from said end portion along at least a portion of the length of said first die,
   a casing having a cylindrical die bore therein for receiving said first die in close fitting relation between the surface of said casing defining said bore and the rims of said end portion and ribbing, a surface portion of said casing defining said bore having at least one channel formed therein extending from the entrance of said bore along a portion of the length thereof to facilitate the removal of gases,
   a second die securely lodged in said bore in close fitting relation with the surface of said casing defining said bore, the bearing surface of said second die facing said entrance and being beyond the end of said channel,
   means for holding said first die partially inserted in said bore in such a manner that the space between the bearing surfaces of said first and second dies communicates with said channel, and
   means for bringing said first die into closing relation with said second die beyond the end of said channel within said bore.

2. The apparatus of claim 1 wherein said ribbing comprises a helically shaped rib.

3. The apparatus of claim 2 wherein said holding means comprises
   a cap having a hole therethrough for receiving said first die therein from the end opposite said end portion, the hole defining surface of said cap being threaded in conformity with said helical rib for loose fitting and overlapping relation therewith, said cap having a flanged shoulder, and
   a coiled spring supported on said casing around the entrance to said bore and adapted to permit unobstructed passage of said first die through the center of said coil along the longitudinal axis thereof and into said bore, said shoulder being supported by said spring.

4. The apparatus of claim 1 wherein said ribbing comprises at least three ribs extending parallel to the longitudinal axis of said first die and equally spaced from one another around the circumference of said first die.

5. The apparatus of claim 4 wherein said holding means comprises a coiled spring supported on said casing around the entrance to said bore and adapted to permit unobstructed passage of said first die through the center of said coil along the longitudinal axis thereof and into said bore, said first die having a flanged shoulder on the end opposite the end containing the bearing surface, said shoulder being supported by said spring.

6. An apparatus for compressing a material comprising
   a cylindrical shaped first die,
   a casing having a cylindrical die bore therein for receiving said first die, at least a portion of the length of said first die being in close fitting relation with the surface of said casing defining said bore, a surface portion of said casing defining said bore having at least one channel formed therein extending from the entrance to said bore along at least a portion of the length thereof to facilitate the removal of gases,
   a second die securely lodged in said bore in close fitting relation with the surface of said casing defining said bore, the bearing surface of said second die facing said entrance and being beyond the end of said channel,
   means for holding said first die partially inserted in said bore in such a manner that the space between the bearing surfaces of said first and second dies communicates with said channel, and
   means for bringing said first die into closing relation with said second die within said bore beyond the end of said channel.

References Cited

UNITED STATES PATENTS

| | | | |
|---|---|---|---|
| 2,744,288 | 5/1956 | Fienberg et al. | 18—VENT DIG. |
| 2,752,635 | 7/1956 | Miller | 18—VENT DIG. |
| 3,277,535 | 10/1966 | Rupert | 18—VENT DIG. |
| 1,958,199 | 5/1934 | Morin | 18—16MUX |
| 2,122,960 | 7/1938 | Schwartzwalder | 18—16.5X |
| 2,135,803 | 11/1938 | Dumert | 18—16.5X |
| 2,214,505 | 9/1940 | Magnenat | 18—16.5UX |
| 2,336,982 | 12/1943 | Cremer | 18—16.5 |
| 2,561,735 | 7/1951 | Haller | 18—16MX |
| 2,598,016 | 5/1952 | Richardson | 18—16.5X |
| 2,889,578 | 6/1959 | Roberts et al. | 18—16M |
| 3,020,589 | 2/1962 | Maritano | 18—16.5 |
| 3,132,379 | 5/1964 | Crane | 18—16.5 |
| 3,156,011 | 11/1964 | Olson | 18—16M |
| 3,156,749 | 11/1964 | Hosfield | 18—16MX |
| 3,198,862 | 8/1965 | Amthor et al. | 18—16MUX |
| 3,245,118 | 4/1966 | Smith | 18—16M |

FOREIGN PATENTS

| | | | |
|---|---|---|---|
| 1,495,175 | 8/1967 | France | 18—16M |

J. HOWARD FLINT, JR., Primary Examiner

U.S. Cl. X.R.

18—Vent Dig., 16.5